May 21, 1935.  P. C. TEMPLE  2,001,988

CONTROL MECHANISM

Original Filed May 14, 1930   2 Sheets-Sheet 1

Inventor
PAUL C. TEMPLE
By
Albert G. Blodgett
Attorney

May 21, 1935. P. C. TEMPLE 2,001,988
CONTROL MECHANISM
Original Filed May 14, 1930 2 Sheets-Sheet 2
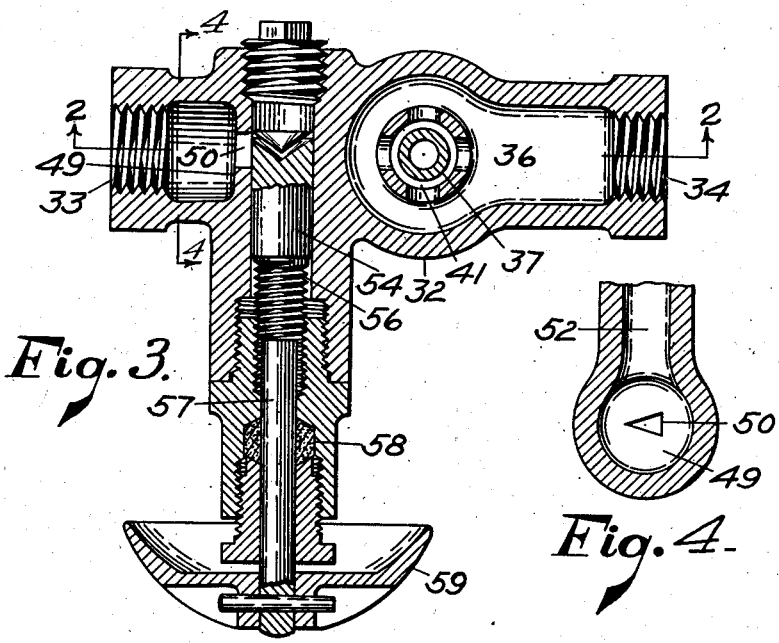
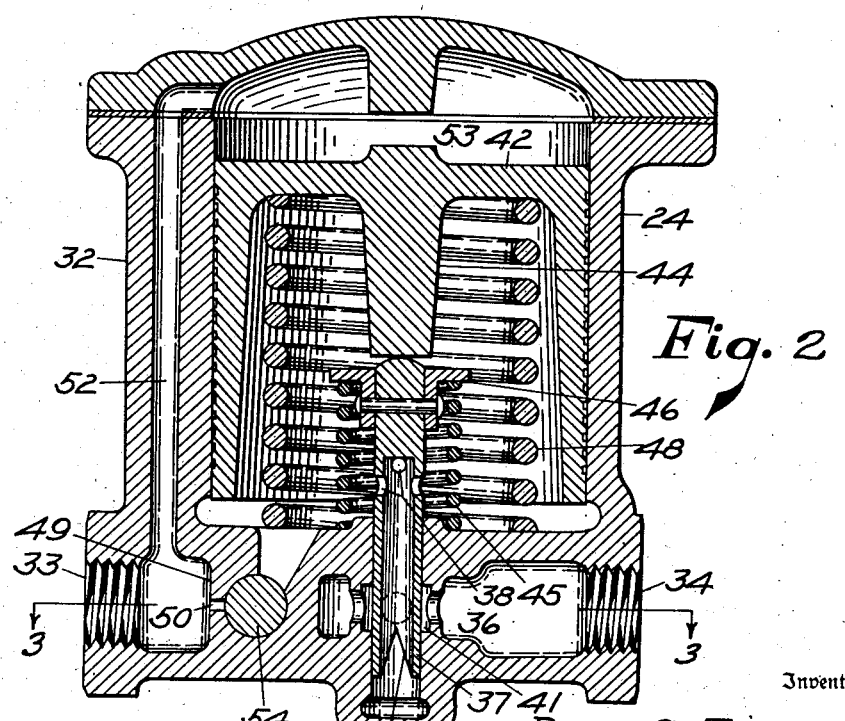
Inventor
PAUL C. TEMPLE
By Albert G. Blodgett
Attorney Patented May 21, 1935

2,001,988

UNITED STATES PATENT OFFICE 2,001,988

CONTROL MECHANISM

Paul C. Temple, Decatur, Ill., assignor to A. W. Cash Company, Decatur, Ill., a corporation of Delaware Original application May 14, 1930, Serial No. 452,434. Divided and this application September 26, 1932, Serial No. 634,873

2 Claims. (Cl. 121—38)

This invention relates to control mechanism, and more particularly to an apparatus for controlling the speed of a fluid pressure operated motor. This application is a division of my prior application Serial No. 452,434 filed May 14, 1930, and issued as Patent Number 1,923,595 on Aug. 22, 1933.

In the construction of various types of apparatus, such as machine tools for example, it is frequently found desirable to utilize fluid pressure motors for the operation of the different parts. It is often important to move such parts at a uniform speed, but this result may be difficult to obtain with prior arrangements, where the pressure of the operating fluid and the resistance to movement are likely to vary within wide limits. Either an increase in the operating pressure or a decrease in the resistance tends to cause an undesirable increase in the speed and thus impair the uniformity of the product.

It is accordingly one object of the invention to provide a fluid operated motor and associated parts which are so arranged that the speed of the motor will be held uniform irrespective of variations in the operating pressure or the resistance to movement.

It is a further object of my invention to provide a simple and effective apparatus including a fluid operated motor, which is so arranged that the speed of the motor may be conveniently adjusted and will be held constant at any desired value.

With these and other objects in view, as will be apparent to those skilled in the art, the invention resides in the combination of parts set forth in the specification and covered by the claims appended hereto.

In accordance with my invention I provide a motor having an element which is movable under the influence of a fluid pressure, and I provide a confined body of liquid which resists the movement of the element. Liquid is allowed to escape from the confined body through a conduit provided with a valve, and the valve is controlled automatically to maintain a constant rate of flow.

Referring to the drawings illustrating one embodiment of the invention, and in which like reference numerals indicate like parts, Fig. 1 is an elevation of a fluid operated motor and associated mechanism, certain parts being shown in section for clearness of illustration;

Fig. 2 is a sectional elevation of the valve mechanism, the section being taken on the line 2—2 of Fig. 3;

Fig. 3 is a section on the line 3—3 of Fig. 2; and

Fig. 4 is a section on the line 4—4 of Fig. 3.

Figure 1:
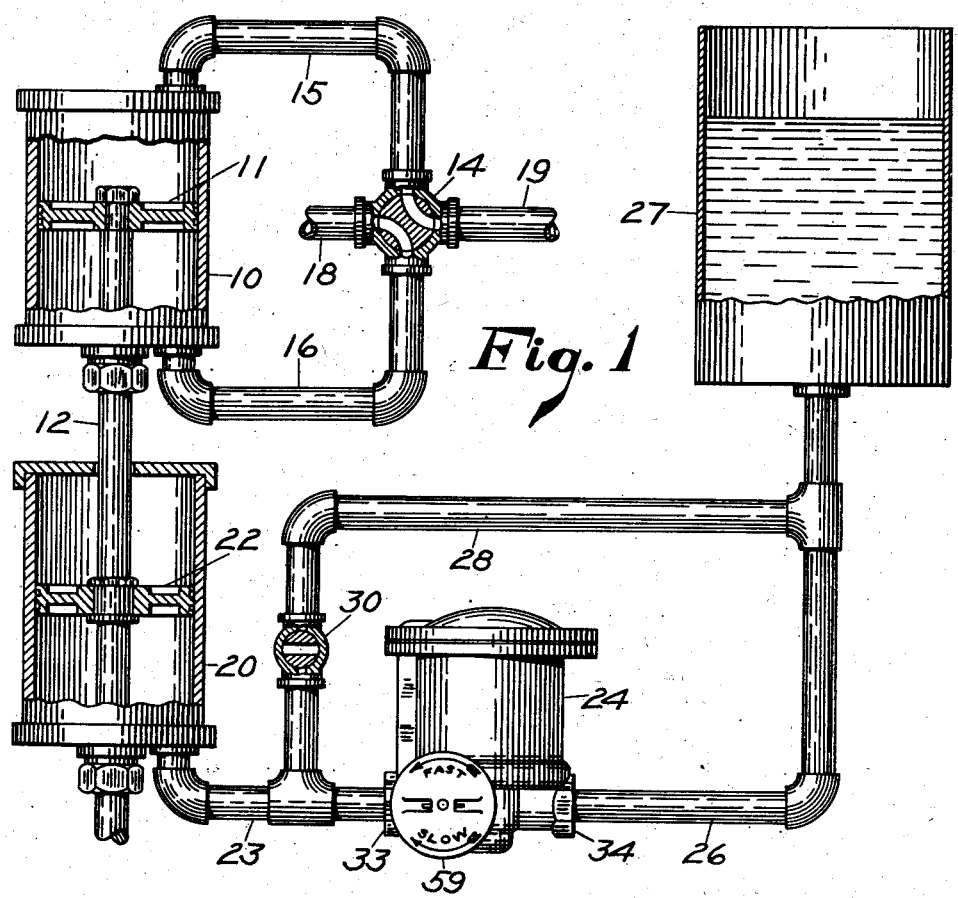

The embodiment illustrated in Fig. 1 of the drawings comprises a cylinder 10, a piston 11 slidable in the cylinder, and a piston rod 12 fastened to the piston. These parts form a fluid operated motor. The movements of the motor piston are controlled by a four-way valve 14, which is connected to a pipe 15 leading to the upper end of the cylinder, a pipe 16 leading to the lower end of the cylinder, to an exhaust pipe 18, and to a supply pipe 19 leading from any suitable supply of fluid under pressure, such as compressed air. This air of course must be at a sufficiently high pressure to overcome any resistance encountered by the piston rod. When the valve 14 is in the position shown, air will flow from supply pipe 19 through pipe 15 to the upper end of the cylinder, forcing the piston 11 to move downwardly. At the same time the air in the lower end of the cylinder will pass through pipe 16 to the exhaust pipe 18. If the valve 14 is turned through 90 degrees in either direction, the lower end of the cylinder will be connected to the supply and the upper end to the exhaust, thus causing upward movement of the piston. The piston rod 12 extends downwardly and is connected to the apparatus (not shown) which is to be operated.

In order to maintain the speed of the piston 11 constant during its downward working stroke, regardless of variations in the air pressure or in the resistance to movement, I preferably provide a second cylinder 20 in line with the cylinder 10. The piston rod 12 passes through the cylinder 20 and carries a second piston 22 which is slidable therein. The lower end of cylinder 20 is connected by a pipe 23 to the inlet of a flow controller 24, and the outlet of the flow controller is connected by a pipe 26 to an elevated tank or reservoir 27 containing a suitable liquid, such as oil. A pipe 28 provided with a valve 30 leads from pipe 23 to pipe 26 and serves as a by-pass conduit around the flow control mechanism.

The flow controller 24 may be of any suitable construction which will maintain a substantially constant rate of flow therethrough. In Figs. 2, 3 and 4 I have illustrated one arrangement which has proven satisfactory in actual service. This embodiment comprises a casing 32 having an inlet opening 33 and an outlet or discharge opening 34. These openings 33 and 34 may be screw-threaded as shown to facilitate the connection of pipes thereto. A conduit 36 leads from the inlet to the outlet, and the flow of liquid in this conduit is controlled by a valve 37, which is preferably so constructed as to be perfectly balanced and free from all tendency to stick or bind. As illustrated this valve may be formed as a hollow cylindrical sleeve slidable vertically in the casing. The valve is provided with ports 38 in its upper portion which lead the liquid to the interior of the valve, and with opposed discharge ports 40 in its wall at its lower end which are preferably V-shaped as shown to give the desired characteristics of operation and prevent wire drawing of the liquid. An annular port 41 in the casing surrounds the sleeve 37 and is arranged to register with the V-shaped ports 40. The casing fits the valve closely both above and below the port 41 and provides a slide way for the valve. With this construction the valve will be opened with an upward movement and closed by a downward movement. As a result of the symmetrical construction of the valve and arrangement of its ports, it will be perfectly balanced under the fluid pressure, and there will be no tendency for it to stick and cause erratic operation.

In order that the valve may be actuated automatically to maintain a constant rate of flow in the conduit 36, I provide a pressure responsive device such as a piston 42 slidable in the casing 32. This piston is preferably arranged above the valve 37 and co-axial therewith. While the piston and valve may be formed integral with each other, I prefer to form them of separate parts as illustrated. This permits each part to be made of the most suitable material and avoids a serious problem in alignment. A projection 44 extends downwardly from the central portion of the piston to the upper end of the valve. The valve is held against this projection by a compression spring 45 which bears against a flange 46 riveted to the valve. A second spring 48, larger in diameter than spring 45, is located beneath the piston. It will be noted that the effect of these two springs is to bias the valve toward open position. The contacting surfaces of the valve and piston are shaped to allow relative movement between these parts in a direction transverse to the sliding movement of the valve, so that even though the valve and piston are out of alignment, the piston cannot transmit lateral stresses to the valve and cause it to bind against the wall of its slide way. In the embodiment illustrated, the projection 44 is shown with a plane horizontal surface which contacts with a convex surface on the upper end of valve 37.

In order to obtain a pressure difference for the operation of the piston 42, I preferably provide a partition 49 which extends across the conduit between the inlet and the outlet, and which has an orifice 50 therein. The liquid in flowing through the orifice is reduced in pressure, the pressure difference being a function of the rate of flow. It will be clear from Fig. 2 that the reduced pressure posterior to the orifice is effective against the lower side of the piston. The pressure at the inlet anterior to the orifice is conducted through a passageway 52 in the casing which leads to the chamber 53 above the piston. It will now be seen that the liquid pressure difference due to the throttling effect of the orifice tends to move the piston downwardly and close the valve, and that this tendency is opposed by the force of the springs. Whenever the rate of flow increases to a point slightly above the value for which the mechanism is set, the pressure drop across the orifice will likewise increase, the piston will move downwardly and close the valve, and normal flow will be restored. If the flow decreases below normal, the pressure drop will decrease, the springs will move the piston upwardly, and the valve will open, thus bringing the rate of flow back to the desired value. The piston and valve float at all times in a proper position to maintain the desired flow, the liquid pressure difference on the two sides of the piston being exactly balanced by the springs. The chamber below the piston 42 is preferably entirely filled with liquid.

I preferably provide means for adjusting the valve mechanism so as to permit a variation in the rate of flow which it will maintain. This may be conveniently accomplished by providing manually operated means for altering the size of the orifice 50, and the preferred construction comprises a cylindrical valve 54 arranged to be moved axially so as to obstruct the orifice to a greater or lesser degree. Improved characteristics are obtained by forming the orifice in the shape of a V as shown in Fig. 4. The valve 54 is provided with a screw-threaded portion 56 and a stem 57. The stem extends through a stuffing box 58 and carries a handwheel 59 on its outer end. By turning the handwheel the valve is moved axially to vary the orifice size. The smaller the orifice size, the greater the pressure drop for a given rate of flow, and hence a lower rate of flow will provide the necessary pressure drop to balance the force of the spring.

The operation of the embodiment illustrated in Fig. 1 is as follows: Assume the pistons 11 and 22 are at the top of their respective cylinders and the lower end of cylinder 20 is filled with oil. With valve 30 closed and valve 14 in the position shown, compressed air will enter the upper end of cylinder 19, causing the pistons to move downwardly and forcing oil out of cylinder 20 through the flow controller and back to the tank 27. The flow controller will automatically maintain a constant rate of flow, as heretofore explained, regardless of variations in the air pressure or in the resistance encountered by piston rod 12 in doing the work for which it is arranged. Of course such variations may cause great changes in the pressure of the oil in cylinder 20, but this cannot affect the flow. Since oil is practically incompressible, the speed of the motor will be directly proportional to the rate of flow, and hence will be kept constant as desired, even though the load should suddenly be entirely removed from the piston rod. For rapid return movement of the pistons upwardly, valve 30 is opened and valve 14 turned through 90 degrees. Oil will then flow from the reservoir 27 through pipe 28, by-passing the controller, and permitting cylinder 20 to fill quickly. By proper manipulation of valve 30, the downward movement may be rapid up to any desired point. As soon as valve 30 is closed, the flow controller will become effective and a desired constant speed maintained.

Having thus described my invention, what I claim as new and desire to secure by Letters Patent is:

1. The combination of a motor having a reciprocable element, means to apply fluid under pressure to the element to move the same in each direction, a cylinder, a piston slidable in the cylinder, means connecting the piston with the reciprocable element, the cylinder serving to confine a body of liquid which resists movement of the piston in one direction, a reservoir for liquid located at a higher elevation than said cylinder, a conduit connecting the cylinder with the reservoir, a valve in the conduit, means providing a restriction in the conduit to create a pressure differential which is a function of the rate of flow in the conduit, means responsive to changes in said pressure differential and arranged to actuate the valve and maintain said pressure differential substantially constant, a by-pass conduit around the valve, and a valve in the by-pass conduit.

2. The combination of two axially aligned cylinders, a piston slidable in each cylinder, a piston rod connecting the pistons, means to admit fluid under pressure to either end of one cylinder and thus move the pistons and piston rod in each direction, the other cylinder serving to confine a body of liquid which resists movement of the pistons and piston rod in one direction, a reservoir for liquid located at a higher elevation than said other cylinder, a conduit connecting said other cylinder with the reservoir, a valve in the conduit, means providing a restriction in the conduit to create a pressure differential which is a function of the rate of flow in the conduit, means responsive to changes in said pressure differential and arranged to actuate the valve and maintain said pressure differential substantially constant, a by-pass conduit around the valve, and a valve in the by-pass conduit.

PAUL C. TEMPLE.